J. C. LUDLAM.
Cartridge Box.
No. 110,379.
Patented Dec. 20, 1870.
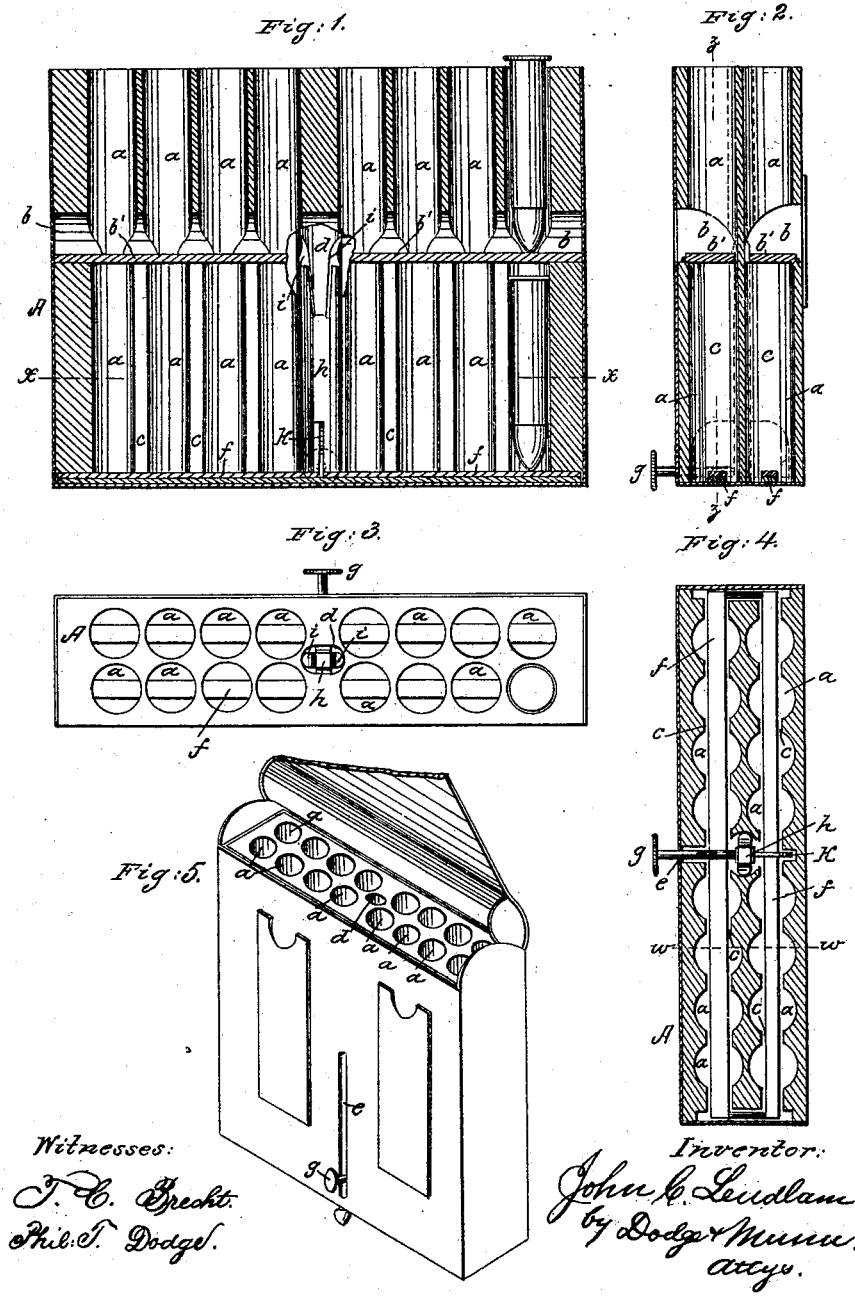

United States Patent Office.

JOHN C. LUDLAM, OF BROOKLYN, NEW YORK.

Letters Patent No. 110,379, dated December 20, 1870.

IMPROVEMENT IN CARTRIDGE-BOXES.

The Schedule referred to in these Letters Patent and making part of the same.

*To all whom it may concern:*

Be it known that I, JOHN C. LUDLAM, of Brooklyn, in the county of Kings and State of New York, have invented certain Improvements in Cartridge-Boxes, of which the following is a specification, reference being had to the accompanying drawing.

The object of my invention is to produce a compact and simple cartridge-box, which shall permit the ready insertion and removal of all the cartridges, and in which the cartridges shall be held free from contact with each other, so as to prevent accidental explosions, &c.

My device consists of a block formed with vertical holes to receive two cartridges each, one above the other, and provided with horizontal hinged doors, to separate the two cartridges in each hole, and with a movable bottom so arranged that a single sliding movement of a knob serves to elevate the lower series or tiers of cartridges after the first or upper series has been used.

In the drawing—

Figure 1 is a longitudinal vertical section of the body or block of my box, taken on the line $z\ z$ of fig. 2;

Figure 2 is a vertical cross-section of the same on the line $w\ w$ of fig. 4;

Figure 3 is a top plan view of the same;

Figure 4 is a horizontal section of the same on the line $x\ x$ of fig. 1; and

Figure 5 is a perspective view of the box complete, with the flap or cover opened.

A represents the body of the box, consisting of a rectangular block of a height about equal to twice the length of the cartridges, having two rows of vertical holes, $a$, made through it to receive the cartridges, which are placed two in each hole, one above the other.

A longitudinal groove or opening, $b$, is cut in each side of the block midway of its height, so as to intersect or open into the middle of the holes on such side, as shown.

To the block at the outer edge of each opening $b$ is hinged a long flap or bar, $b'$, which may be turned down, as shown in figs. 1 and 2, so as to form a division across the middle of the holes, or turned up so as to leave the holes unobstructed. When turned down across the holes $a$ these bars or flaps $b'$ serve as supports for the top cartridges to keep them off from those below, and thus the cartridges are held from contact with each other. In this way the danger of the cartridges exploding or battering each other is entirely obviated.

Two longitudinal vertical grooves, $c$, are cut through the lower part of the block, one through each row of holes, $a$, as shown; and through the middle of the block a vertical hole, $d$, is made, and a vertical slot, $e$, cut transversely outward from this hole through the face of the block, as shown in figs. 1, 2, and 4. The grooves $c$ and the slot $e$ extend from the bottom of the block about half way to the top of the same, as shown.

In the lower part of the block is mounted a sliding frame, consisting of two horizontal bars, $f$, connected together, one of said bars being placed in each groove $c$, and extending through or across the whole row of holes $a$, as shown, so that the lower cartridges rest thereon, as shown in fig. 1.

To the bars $f\ f$ is connected an arm, $g$, which extends out through the slot $e$, and is provided with a knob or thumb-piece on its end, as shown in figs. 2, 3, and 4, so that by moving the knob upward the bars may be raised and the cartridges upon them shoved up so that their ends protrude above the block.

To the bars $f$ there is also attached an upright arm, $h$, which projects upward in the hole $d$, and has two spring arms on its upper end, each of which arms has a beveled lip or shoulder, $i$, on the outer side, so that, when the bars $f$ are raised to elevate the cartridges, the catches $i$ engage over the edges of the hole $d$ and support the bars, as required.

To the arm $b$ and bars $f$ is attached a plate, $k$, which, when the bars $f$ are elevated, strikes the hinged flaps or doors and turns them up, the said doors being so arranged as to fall down by their weight as soon as released.

When the box thus constructed is to be filled the arm $g$ is pushed up, and thereby the bars $f$ elevated and the doors or flaps $b$ turned up. A cartridge is then inserted, point downward, into each of the holes, so as to rest with its point or ball on the bars, and with its back end protruding out of the top of said holes. The two spring catches $i$ are then pressed together between the thumb and finger so as to release the bars $f$ and the knob of arm $g$, then pushed down so as to let the cartridges slide down past the flaps or doors $b$, which latter then shut down above or over the cartridges. Another cartridge is then placed, point downward, in each hole, $a$, on top of the flaps or doors $b$, as shown in fig. 1, the end or butt of the cartridges protruding a little above the block, so that they may be readily seized and withdrawn.

When the box is thus filled the upper cartridges, being one-half of those in the box, are first used, and then the arm $g$ raised and the lower series of cartridges shoved up past the doors in place of the top series, so that they may be removed by grasping their projecting ends.

The body or block A may be used in any suitable case, provided with belts or straps whereby to carry it—a slot being, of course, made in said case, as shown in fig. 5, for the arm $g$. The body or block may be made of wood or other suitable material, or of wood encased in or strengthened by metal.

It is obvious that the form and the arrangement of the parts may be varied at will, provided only that the doors are so arranged as to separate the upper and lower cartridges, and the bottom or frame so arranged as to elevate the lower cartridges, after the upper ones have been removed.

A cartridge-box thus constructed is very simple and cheap, is not liable to become disarranged or broken, and can be very rapidly filled and emptied.

It also permits the use of center-pinned cartridges, without danger of igniting them by the concussion of their ends, which is very important, as this kind of ammunition is now extensively used.

Having thus described my invention, What I claim is—

1. A cartridge-box, consisting of the body A provided with a series of holes $a$, in combination with the lifting-bars $f$, arranged to work in slots in the lower portion of the body, substantially as and for the purpose set forth.

2. The hinged doors or flaps $b'$, arranged to work in cavities in the sides of the body A and support the upper tier of cartridges, substantially as set forth.

3. The arm $h$, provided with the spring hooks $i$ and the shoulders $k$, in combination with the bars $f$, arranged to operate substantially as described.

4. In combination with the lifting-bars $f$, working in the slots of the body A, the handle $g$, protruding through the vertical slot $e$, substantially as described.

JOHN C. LUDLAM.

Witnesses:
    JAMES IMBRIE, Jr.,
    GEO. D. CUSHMAN.